(12) United States Patent
Crutchfield et al.

(10) Patent No.: US 12,195,403 B2
(45) Date of Patent: Jan. 14, 2025

(54) BLADDER CAST SLURRY INFILTRATION

(71) Applicant: Rolls-Royce Corporation, Indianapolis, IN (US)

(72) Inventors: Jeffrey Crutchfield, Long Beach, CA (US); Christopher Downie, Placentia, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 201 days.

(21) Appl. No.: 17/302,958

(22) Filed: May 17, 2021

(65) Prior Publication Data

US 2022/0363605 A1 Nov. 17, 2022

(51) Int. Cl.
| | | |
|---|---|---|
| *C04B 41/45* | (2006.01) | |
| *B28B 1/52* | (2006.01) | |
| *B28B 7/00* | (2006.01) | |
| *B28B 7/06* | (2006.01) | |
| *B28B 7/32* | (2006.01) | |
| *B28B 7/38* | (2006.01) | |
| *C04B 35/80* | (2006.01) | |
| *B28B 3/00* | (2006.01) | |
| *B28B 7/34* | (2006.01) | |

(52) U.S. Cl.
CPC ............ *C04B 41/4578* (2013.01); *B28B 1/52* (2013.01); *B28B 7/0061* (2013.01); *B28B 7/06* (2013.01); *B28B 7/32* (2013.01); *B28B 7/384* (2013.01); *C04B 35/80* (2013.01); *B28B 3/003* (2013.01); *B28B 7/0091* (2013.01); *B28B 7/348* (2013.01); *C04B 41/4539* (2013.01); *C04B 41/457* (2013.01); *C04B 2235/5252* (2013.01); *C04B 2235/616* (2013.01)

(58) Field of Classification Search
CPC ... C04B 2235/616; B28B 7/0061; B28B 7/06; B28B 7/32; B28B 7/0091; B28B 7/348; B28B 7/384; B28B 3/003; B30B 11/001; B29C 33/60
See application file for complete search history.

(56) References Cited

U.S. PATENT DOCUMENTS 5,087,193 A * 2/1992 Herbert, Jr. ......... B29C 43/3642
425/389
5,534,203 A * 7/1996 Nelson .................. A63B 53/12
264/257

(Continued)

FOREIGN PATENT DOCUMENTS

WO WO-2020209848 A1 * 10/2020

*Primary Examiner* — Benjamin A Schiffman
(74) *Attorney, Agent, or Firm* — Shumaker & Sieffert, P.A.

(57) ABSTRACT

A method of forming a bladder cast ceramic matrix composite (CMC) article including infiltrating a CMC substrate positioned in a cavity of a mold body with a slurry. The CMC substrate includes reinforcement material defining inner spaces. The slurry includes solid particles and a carrier material. During infiltration, the slurry at least partially fills at least a portion of the inner spaces of the CMC substrate. The method also includes inflating at least one bladder that is coupled to the mold body and disposed within the cavity such that a surface of the at least one bladder in an inflated configuration contacts at least one surface of the CMC substrate. The method also includes drying the slurry to remove at least a portion of the carrier material form an infiltrated CMC and deflating the at least one bladder.

13 Claims, 3 Drawing Sheets

(56) References Cited

U.S. PATENT DOCUMENTS

| | | | | |
|---|---|---|---|---|
| 6,071,460 | A * | 6/2000 | Renaudin | B29C 70/446 |
| | | | | 425/389 |
| 6,159,414 | A * | 12/2000 | Tunis, III | B29C 43/021 |
| | | | | 257/571 |
| 6,533,986 | B1 * | 3/2003 | Fosaaen | B28B 11/003 |
| | | | | 425/389 |
| 8,765,048 | B2 * | 7/2014 | Ruiz | B29C 70/443 |
| | | | | 425/389 |
| 9,302,946 | B2 * | 4/2016 | Ritti | C04B 35/62873 |
| 10,328,604 | B2 * | 6/2019 | Podgorski | B28B 1/265 |
| 10,400,367 | B2 * | 9/2019 | Diss | B28B 7/46 |
| 10,563,523 | B2 * | 2/2020 | Schetzel | F01D 5/282 |
| 2010/0285265 | A1 * | 11/2010 | Shinoda | D04H 5/10 |
| | | | | 428/80 |
| 2011/0293828 | A1 * | 12/2011 | Eberling-Fux | C04B 35/80 |
| | | | | 427/249.2 |
| 2016/0354968 | A1 * | 12/2016 | Zamora Rodriguez | |
| | | | | B29C 70/446 |
| 2018/0257314 | A1 * | 9/2018 | Destories | B29C 70/342 |
| 2020/0207033 | A1 * | 7/2020 | Wang | B29C 33/3821 |
| 2021/0221073 | A1 * | 7/2021 | Knebel | B29C 66/81455 |

\* cited by examiner

BLADDER CAST SLURRY INFILTRATION

BACKGROUND

Reinforced ceramic matrix composite (CMC) components are well suited for structural applications because of their toughness, thermal resistance, high temperature strength and chemical stability. To make a CMC component, fiber is initially shaped to create a preform, the preform may be rigidized with one or more ceramic phases and the porosity within the preform may be filled with a ceramic slurry. For example, silicon carbide (SiC) matrix composites have been made by infiltrating a SiC slurry into a porous fiber preform to form a green composite article. A molten alloy infiltrant material including silicon (Si) may then be introduced into the green composite article using capillary forces to densify the structure and form a CMC component.

SUMMARY

In some examples, the present disclosure is directed to a method of forming a composite article. The method may include infiltrating a ceramic matrix composite (CMC) substrate positioned in a cavity of a mold body with a slurry. The CMC substrate may include reinforcement material defining inner spaces. The slurry may include solid particles and a carrier material. During infiltration, the slurry may at least partially fill at least a portion of the inner spaces of the CMC substrate. The method also may include inflating at least one bladder coupled to the mold body that is disposed within the cavity. During inflation, a surface of the at least one bladder in an inflated configuration may contact at least one surface of the CMC substrate. The method also may include drying the slurry to remove at least a portion of the carrier material to form an infiltrated CMC that includes the solid particles from the slurry. The method also may include deflating the at least one bladder.

In some examples, the present disclosure is directed to a system for forming a CMC article. The system may include a mold body and at least one bladder. The mold body may define a cavity configured to receive a ceramic matrix composite (CMC) substrate and a slurry that includes solid particles and a carrier material. The at least one bladder may be coupled to the mold body and disposed within the cavity. The at least one bladder may be configured to inflate to contact a surface of the at least one bladder with at least one surface of the CMC substrate to form a bladder cast finish on the at least one surface of the CMC substrate.

In some examples, the present disclosure is directed to a system for forming a composite article. The system may include a mold body, a slurry reservoir, at least one bladder, and a computing device. The mold body may define a cavity configured to receive a ceramic matrix composite (CMC) substrate and a slurry. The CMC substrate may include reinforcement material defining inner spaces. The slurry may include solid particles and a carrier material. The slurry reservoir may be configured to introduce the slurry into the cavity. The at least one bladder may be coupled to the mold body and disposed within the cavity. The fluid reservoir may be configured to inflate the at least one bladder. The computing device may be configured to control the slurry reservoir to introduce the slurry into the cavity, such that the slurry at least partially fills at least a portion of the inner spaces of the CMC substrate. The computing device also may be configured to control the fluid reservoir to inflate the at least one bladder, such that a surface of the at least one bladder in an inflated configuration contacts at least one surface of the CMC substrate.

The details of one or more embodiments of the invention are set forth in the accompanying drawings and the description below. Other features, objects, and advantages of the invention will be apparent from the description and drawings, and from the claims.

DETAILED DESCRIPTION

Slurry infiltration of a preform positioned in a mold body under vacuum has been used to draw a slurry into the preform pores to form CMC components. A mold body having surfaces directly adjacent to or touching a surface of the preform may inhibit slurry infiltration at those surfaces. Enlarging the mold body may promote even slurry infiltration at all surfaces of the perform, but may result in excess cured slurry on the surface of the component. The excess cured slurry may be removed in additional post-processing steps, which may be extensive to achieve a desired surface finish, may damage the component, or both.

To improve slurry infiltration, provide an improved surface finish (e.g., profile tolerance), and/or reduce post-processing steps, the present disclosure is directed to slurry infiltration systems and techniques utilizing one or more inflatable bladders. In an example bladder cast slurry process, after a liquid slurry is introduced into a mold body, a vacuum may be applied to the mold body to promote infiltration of the slurry into a preform. Once the slurry fully encompasses preform, the bladders may be inflated with a fluid. The bladders may expand until mold surfaces of the bladders contact respective surfaces of the preform. The mold surfaces of the bladders may conform to contact points on the preform that define the outermost surface of the component. Additionally, or alternatively, the bladders may further promote infiltration of the slurry into the preform. With the bladders inflated, the slurry may be dried and/or cured. After drying and/or curing, the bladders may be deflated, and the component may be removed. The component may include substantially smooth bladder-casted surfaces having an improved surface finish (e.g., a bladder cast finish) with reduced post-processing steps, compared to other slurry infiltration systems and techniques.

Figure 1:
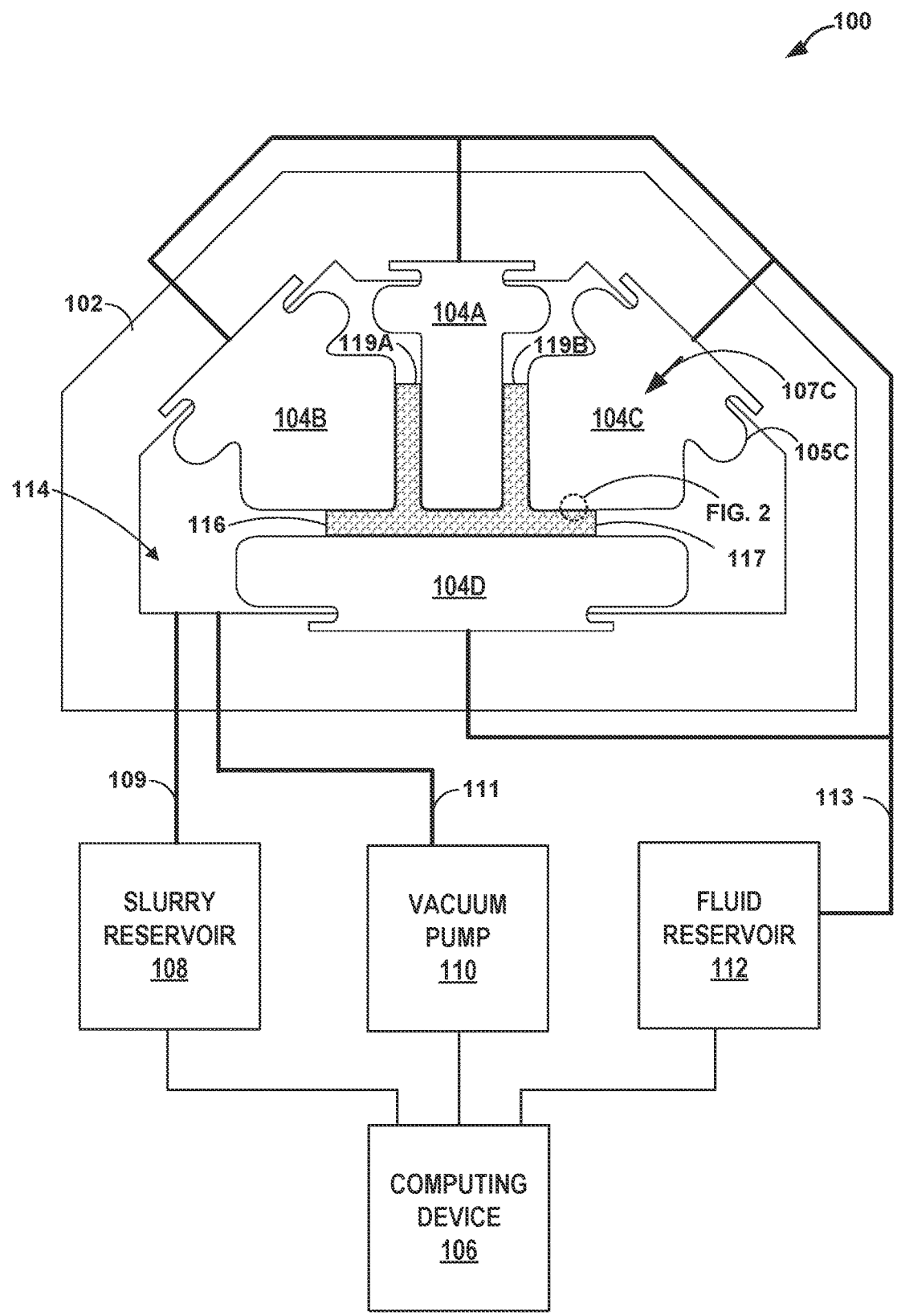
FIG. 1 is conceptual and schematic diagram illustrating an example system for forming an article using bladder cast slurry infiltration.

FIG. 1. is a conceptual and schematic diagram illustrating an example system 100 for slurry infiltration of an article 101 with inflatable bladders. System 100 includes mold body 102, inflatable bladders 104A, 104B, 104C, and 104D (collectively, bladders 104), computing device 106, slurry reservoir 108, vacuum pump 110, and fluid reservoir 112.

Article 101 may include a component of a high temperature mechanical system, such as a component of a gas turbine engine. For example, article 101 may include a seal segment, a blade track, an airfoil, a blade, a vane, a combustion chamber liner, or other gas turbine engine component. Article 101 includes a substrate material (e.g., a CMC substrate) having inner spaces (e.g., pores) that may be at least partially filled with solid particles of a slurry via slurry infiltration. For example, the slurry may include solid particles in a carrier material (e.g., one or more solvents), and optional additives configured to aid in the infiltration of the slurry.

Mold body 102 defines a cavity 114 that is configured to receive article 101. For example, at least one surface of mold body 102 may be removable or openable to insert article 101 into cavity 114. During a slurry infiltration process, article 101 is positioned in cavity 114 of mold body 102. In some examples, mold body 102 may include one or more support structures protruding into cavity 114 that are configured to retain article 101 in selected position and/or orientation within cavity 114. In this way, mold body 102 may surround and optionally support article 101 for slurry infiltration. Mold body 102 (including the optional support structures) may be formed of any suitable material including, for example, graphite, silica, alumina, or one or more materials that are non-reactive with the slurry or article 101 during the slurry infiltration process. In some examples, the material from which mold body 102 is formed may be selected to allow release of the dried and/or cured slurry after completion of the slurry infiltration process.

After closing mold body 102, a slurry may be introduced into cavity 114. For example, slurry reservoir 108 may include one or more pumps, one or more mixers, one or more control devices (e.g., valves, regulators, or the like), and/or one or more hoppers or containers configured to store and dispense one or more components of a selected slurry (e.g., the carrier material, the solid particles, and/or the additives). Computing device 106 may control slurry reservoir 108 to pump or otherwise introduce the slurry into cavity 114 via a slurry feedline 109. Although illustrated as including one slurry feedline 109, in some examples, slurry reservoir 108 may be fluidly coupled to cavity 114 by two or more slurry feedlines. Fluidly coupling slurry reservoir 108 to cavity 114 with two or more slurry feedlines may provide more uniform coverage of article 101 during slurry introduction.

In some examples, prior to or during introduction of the slurry, a vacuum may be drawn in cavity 114 to purge gas from inner spaces (e.g., pores) of article 101. For example, computing device 106 may control vacuum pump 110 fluidly coupled to cavity 114 via vacuum line 111 to purge gas from cavity 114. In some examples, mold body 102 may include one or more pressure sensors operatively coupled to computing device 106 to enable computing device 106 to draw vacuum to a selected pressure. Although illustrated as including one vacuum line 111, in some examples, vacuum pump 110 may be fluidly coupled to cavity 114 by two or more vacuum lines. Drawing a vacuum (e.g., relative to atmospheric pressure) may improve infiltration of the slurry into the inner spaces of article 101 by reducing pressure gradients that may form within inner spaces of article 101 as the slurry infiltrates the inner spaces.

The slurry infiltration may be conducted at any temperature, including room temperature (e.g., between about 20° C. and about 35° C.), suitable for the selected materials of system 100, article 101, and the slurry. In this regard, system 100 may include one or more temperature sensors and/or one or more temperature regulators (not illustrate), such as, for example, one or more electronic or liquid heat exchangers.

After introduction of the slurry, bladders 104 may be inflated using fluid reservoir 112. For example, bladders 104 may be fluidly coupled to fluid reservoir 112 via fluid feedlines 113. Fluid reservoir 112 may include one or more pumps, one or more control devices (e.g., valves, regulators, pressure sensors, flow sensors, or the like), and/or one or more containers configured to pump a fluid into bladders 104 at a selected rate, to a selected pressure, or both. The fluid may include an incompressible fluid, such as water, an alcohol or a liquid (e.g., at the temperature of the slurry infiltration process) that is non-reactive with the substrate material of article 101, or a compressible fluid, such as air, nitrogen, hydrogen, or a gas (e.g., at the temperature of the slurry infiltration process) that is non-reactive with the substrate material of article 101. In some examples, computing device 106 may control fluid reservoir 112 to inflate bladders 104 at a selected rate, to a selected pressure, or both. Inflation of bladder 104 may increase the pressure within cavity 114. Additionally, or alternatively, inflation of the bladders 104 may cause at least a portion of bladders 104 to contact a respective surface of article 101. The increase in pressure and contact of bladders 104 with a surface of article 101 may improve infiltration by urging the slurry into the inner spaces of article 101.

In some examples, bladders 104 may be inflated simultaneously, e.g., at a substantially similar rate and/or to a substantially similar pressure. As used herein, a substantially similar rate and/or a substantially similar pressure means the same rate and/or pressure within the tolerances of the pump and/or control devices of fluid reservoir 112. Simultaneously inflating bladders 104 may promote more even infiltration of In some examples, one or more bladders 104 may be selectively inflated, e.g., in a particular sequence of rates and/or pressures. Selectively inflating bladders 104 may prevent or reduce movement of article 101 during inflation of bladders 104, reduce damage or deformity of article 101 during inflation of bladders 104, improve infiltration of the slurry into article 101, or both.

Bladders 104 may include any suitable material configured to inflate in response to the introduction of the fluid. For example, bladders 104 may include polymeric material, an elastomer, natural rubbers, styrene-butadiene block copolymers, polyisoprene, polybutadiene, ethylene propylene rubber, ethylene propylene diene rubber, silicone elastomers, fluoroelastomers, polyurethane elastomers, nitrile rubber, polytetrafluoroethylene, nylon, neoprene, or Kalrez available from DuPont de Nemours, Inc., Wilmington, Delaware.

The inflatability of bladders 104 enable simpler mechanical movement compared to rigid mold bodies. For example, bladders 104 are inflated by fluid reservoir that may be external to mold body 102 and do not require any moving mechanical parts such as levers or gears within mold body 102.

Additionally, or alternatively, a flexibility of bladders 104 allows for greater variation in an exterior surface of article 101 compared to rigid mold bodies. For example, a flexibility of bladders 104 may better contour to an imperfect surface geometry of article 101 compared to a rigid mold body that cannot flex to contour to an imperfect surface geometry of article 101. In this way, bladders 104 may provide a more consistent surface profile relative to the surface geometry of article 101, reduce areas of excess slurry between the bladder 104 and the surface of article 101 compared to a rigid mold body, or both.

Bladders 104 include a shape configured to, when in an inflated configuration, define a selected mold shape. For example, as illustrated in FIG. 1, article 101 includes a turbine engine seal segment having a base 117 and tips 119A and 119B (collectively, tips 119). Bladder 104A includes a rectangular prism shape configured to contact an interior surface of base 117 and an interior surface of each of tips 119. Bladders 104B and 104C include triangular prism shapes configured to contact an interior surface base 117 and an interior surface of tip 119A and tip 119B, respectively. Bladder 104D includes a rectangular prism shape configured to contact an exterior surface of base 117. In this way, bladders 104 include a shape that defines a selected mold shape of article 101.

Although illustrated as having at least some edges of article 101 exposed (e.g., not in contact with a bladder 104), in other examples, bladders 104 may be shaped to contact all surfaces of article 101. Alternatively, bladders 104 may be arranged and/or shaped to contact only selected surfaces of article 101. For example, bladders 104 may be shaped to contact surfaces of article 101 selected to have a predetermined surface finish tolerance, e.g., a bladder cast finish.

In some examples, bladders 104 may include one or more features configured to control a direction of inflation of bladders 104. For example, as illustrated in FIG. 1, bladders 104 include an optional bellows (e.g., bellows 105C of bladder 104C). Bellows 105C defines a bulge or bulbous structure near the base of bladder 104C that extends in a direction substantially parallel (e.g., parallel or nearly parallel within common slurry mold body design tolerances) to an adjacent wall of mold body 102. During inflation of bladder 104C, bellow 105C may urge bladder 104C to inflate in a direction substantially perpendicular to bellows 105C (illustrated as arrow 107C). Each of bladders 104A, 104B, and 104D also are illustrated as including respective bellows configured to urge the respective bladders 104 in a respective direction during inflation.

Although illustrated as a bellows, in other examples, bladders 104 may include additional or alternative features configured to control a direction of inflation of bladders 104. For example, bladders 104 may include bands of relatively less elastic material, e.g., relative to other material of bladder 104, that control an inflation direction of inflation of bladders 104. Additionally, or alternatively, bladders 104 may include areas or patterns of relatively thinner and relatively thicker material or scrim plies, which may be configured to control an inflation direction of inflation of bladders 104.

In some examples, a mold surface of bladders 104 that is configured to contact article 101 may include a release agent. The release agent may include a material or coating configured to facilitate release of article 101 from bladders 104 after drying and/or curing the slurry. For example, bladders 104 may be at least partially formed from, at least partially coated with, or at least partially formed from and at least partially coated with one or more materials that are hydrophobic relative to the slurry to facilitate release of article 101. Materials that are hydrophobic relative to the slurry may include, but are not limited to, polytetrafluoroethylene, fluorinated ethylene propylene, perfluoroalkoxy, polyvinylidene fluoride, ethylene tetrafluoroethylene, ethylene chlorotrifluoroethylene, tetrafluoroethylene perfluoromethylvinylether, terpolymer of tetrafluoroethylene, hexafluoropropylene and vinylidene fluoride, polychlorotrifluoroethylene, or polytetrafluoroethylene. Additionally, or alternatively, bladders 104 may be at least partially coated with one or more materials that may be melted after drying and/or curing the slurry to facilitate release of article 101. Materials that may be melted after drying and/or curing the slurry may include, but are not limited to, waxes (e.g., ancillary wax, runner wax, sprue wax, or other casting waxes), low melting point polymers (e.g., polymers having a melting point less than about 200° C., or less than about 100° C.), or low glass transition temperature polymers (e.g., polymer having a melting point less than about 200° C., or less than about 100° C.).

Computing device 106 may be configured to control slurry reservoir 108, vacuum pump 110, and/or fluid reservoir 112 to perform a slurry infiltration process. For example, computing device 106 may be operatively coupled (e.g., via one or more wired or wireless connections) with one or more components of system 100 to send data to and/or receive data from any of mold body 102, cavity 103, bladders 104, slurry reservoir 108, vacuum pump 110, and/or fluid reservoir 112. Computing device 106 may include, for example, a smartphone, a tablet computer, a laptop computer, a desktop computer, or the like. Computing device 106 may include various types of fixed function and/or programmable processing circuitry or other hardware, including, but not limited to, microprocessors, controllers, digital signal processors (DSPs), application specific integrated circuits (ASICs), field-programmable gate arrays (FPGAs), or equivalent discrete or integrated logic circuitry, as well as combinations of such components. The term "processing circuitry" may generally refer to any of the foregoing logic circuitry, alone or in combination with other logic circuitry, or any other equivalent circuitry. In some examples, computing device 106 includes hardware that can be configured to execute firmware and/or software that sets forth one or more of the techniques described herein. For example, computing device 106 may be configured to implement functionality, process instructions, or both for execution of processing instructions stored within one or more storage components.

After infiltration, the slurry may be dried to remove the carrier material, leaving behind the solid particles of the slurry. Bladders 104 may remain inflated during drying, or the inflation of bladders 104 may be adjusted during drying (e.g., bladders 104 may be fully or partially deflated or an inflation of bladders 104 may be increased). In some examples, the dried slurry may form a bladder cast surface layer on article 101. A thickness of the bladder cast surface layer may be within a range from about 0 micrometers to about 1 millimeter, such as less than about 125 micrometers.

Figure 2:
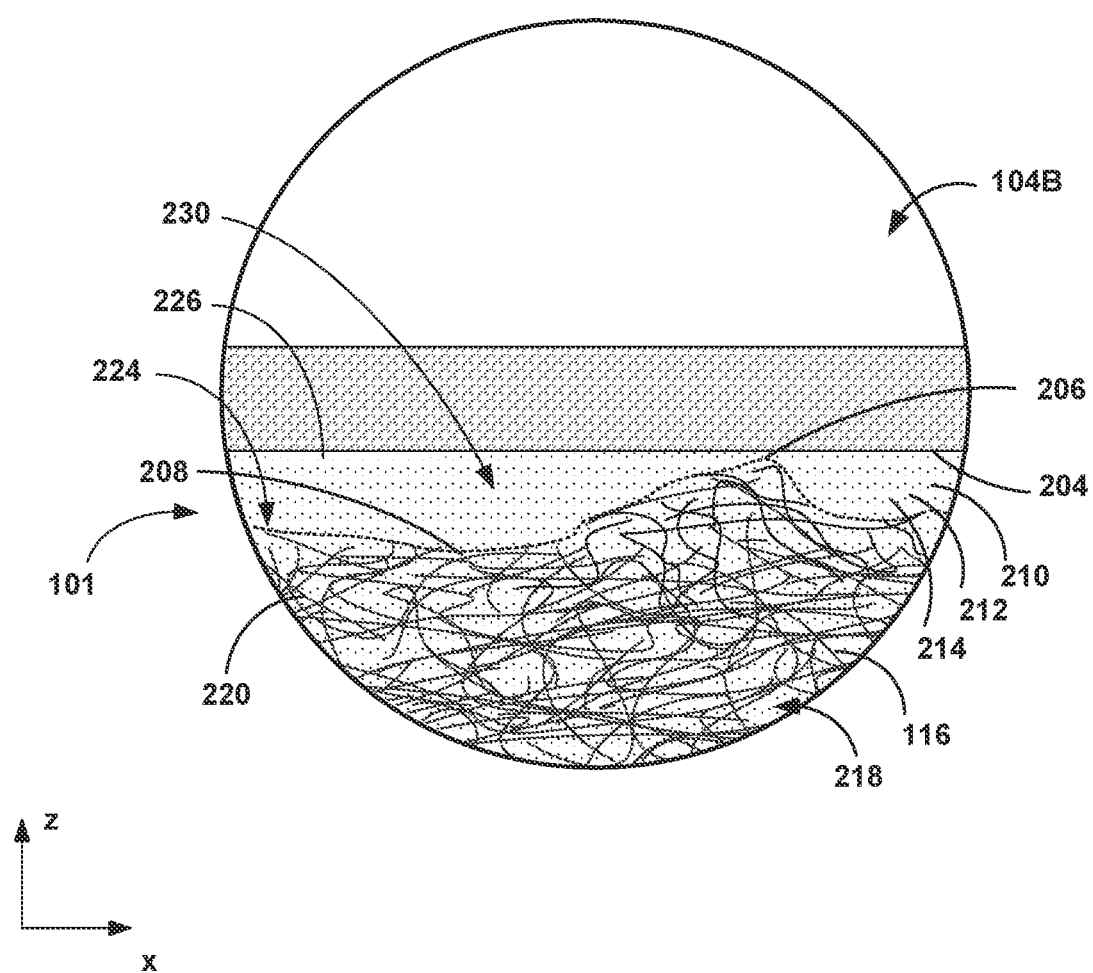
FIG. 2 is a conceptual diagram illustrating a portion of the article and bladder of the system illustrated in FIG. 1.

FIG. 2 is a conceptual diagram illustrating cross-sectional view of a portion of system 100 and article 101 that includes slurry 210 and CMC substrate 216. CMC substrate 216 includes reinforcement material 220, which defines inner spaces 218. In some examples, reinforcement material 220 may include continuous fibers, chopped fibers, woven fibers, or combinations thereof. The composition of reinforcement material 220 may include aluminum oxide, aluminosilicate, carbon, carbon nitride, metal oxides, mullite, silicon carbide, silicon carbon nitride, silicon nitride, silicon oxide, or combinations thereof. In some examples, reinforcement material 220 may include continuous monofilament or multifilament fibers of one or more of the materials. Although reinforcement material 220 is illustrated as including non-woven fibers, in some examples, reinforcement material 220 may be include one or more layers of woven fibers. For example, reinforcement material 220 may include a lay-up of two or more woven fiber (e.g., fabric) layers. In some examples, reinforcement material 220 may include a lay-up of one or more woven fiber layer and one or more non-woven fiber layers.

The fibers of reinforcement material 220 may include an optional fiber interface material. The optional fiber interface material may rigidize the fibers, densify CMC substrate 216, or both, prior to the infiltration of the slurry. Example optional fiber interface materials include pyrolytic carbon, boron nitride, or other materials suitable for coating reinforcement material 220. In some examples, the optional fiber interface material may be deposited on the reinforcement material 220 using any suitable technique such as, for example, chemical vapor infiltration (CVI) or chemical vapor deposition (CVD).

Inner spaces 218 (e.g., pores) of CMC substrate 216 between reinforcement material 220 may be infiltrated with slurry 210 that includes carrier material 212 and solid particles 214. Carrier material 212 may include at least one solvent compatible with reinforcement material 220, the optional interface material, and/or solid particles 214. In some examples, carrier material 212 may include water, ethanol, isopropyl alcohol, methyl ethyl ketone, toluene, or the like. During the drying of slurry 210, carrier material 212 may be substantially removed (e.g., removed or nearly removed) from article 101, leaving behind the solid contents of slurry 210 (e.g. solid particles 214).

Solid particles 214 may include any suitable material configured to at least partially fill inner spaces 218 In some examples, solid particles 214 may include aluminum oxide, aluminosilicate, boron carbide, carbon, ceramics, metal oxides, molybdenum carbide, silicon carbide, silicon nitride, silicon oxide, or combinations thereof. Solid particles 214 may include particles having an average particle diameter sufficiently small to allow the particles to infiltrate inner spaces 218 (e.g., open pores) of CMC substrate 216. For example, solid particles 14 may have an average particle diameter less than about 50 micrometers, such as less than about 20 micrometers. In some examples, solid particles 214 may include particles having a uniformly or a non-uniformly distributed particle size. In some examples, solid particles 214 may be selected to include substantially the same (e.g., the same or nearly the same) components used to form reinforcement material 220. In this way, solid particles 214 may reduce the stress exerted on CMC substrate 216 as a result of differences between a thermal expansion coefficient of reinforcement material 220 and a thermal expansion coefficient of solid particles 214.

In some examples, slurry 210 may include one or more optional additives. The additives may be used to control the properties of slurry 210. For example, the one or more optional additives may include matrix precursors or other reactive elements that react with silicon metal or silicon alloy (e.g., silicon carbide or silicon nitride) during a melt infiltration process (e.g., after drying of slurry 210) and contribute to the solid materials included in inner spaces 218. In some examples, the one or more optional additives may include a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK 110 (available from Byk USA, Inc., Wallingford Connecticut), or the like), or other materials configured to control a dispersion of solid particles 214 in slurry 210. In some examples, other additives such as a surfactant (e.g., ethoxylated acetylenicgemini surfactant) may be included in slurry 210 to improve wetting of slurry 210. The selection and amount of the one or more optional additive components may depend on the intended application for article 101.

In some examples, a composition of slurry 210 may include about 35% to about 65% by weight carrier material, about 35% to 65% by weight of solid particles 214, and up to 10% percent by weight optional additives (e.g., up to 8% by weight carbon material, up to 2% by weight surfactant, or the like).

As illustrated in FIG. 2, slurry 210 including solid particles 214 may infiltrate into at least some inner spaces 218 of CMC substrate 216. In some examples, surface 224 (e.g., illustrated as a dashed line) of CMC substrate 216 may be textured or uneven. For example, surface 224 may include multiple peaks (e.g., peak 206) and valleys (e.g., valley 208) due to a fiber structure of reinforcement material 220.

After introduction of slurry 210 into cavity 114 and during inflation of bladders 104, a mold surface 204 of bladders 104 may contact the textured surface 224 of CMC substrate 216. For example, mold surface 204 of bladder 104B may contact peak 106 of CMC substrate 216. Slurry 210 may fill the void 230 defined by mold surface 204 and valleys 208. By contacting the multiple peaks of surface 224, the mold surfaces (e.g., mold surface 204) of bladders 104 may define a more uniform or flat surface 226 relative to a textured or uneven surface 224 of CMC substrate 216. In this way, slurry infiltration using bladders 104 may improve surface finish (i.e., provide a bladder cast finish of surface 226) relative to slurry infiltration processes without bladders 104. Additionally, or alternatively, the increased smoothness of surface 226 may reduce post-processing steps, such as, for example, removing surface material (e.g. solid particles 14 of the dried slurry) to establish a substantially planar (e.g., planar or nearly planar) surface.

In some examples, one or more second slurries may be applied to surface 226 to further increase the surface smoothness of article 101. The one or more second slurries also may further protect the underlying reinforcement material 220 as compared to applying only a single slurry to CMC substrate 216. For example, subsequent machining of surface 224 may cause reinforcement material 220 (e.g., fibers) to become partially exposed or damaged, which may affect the durability of article 101. The one or more second slurries may provide a sufficient coverage to protect reinforcement material 220 during subsequent machining, such as removing high spots in the one or more second slurries. In some examples, a second slurry may be applied in the same manner described with respect to slurry 210.

After drying and/or curing slurry 210, a melt infiltration process may increase the overall density of article 101, e.g., by filling voids between particles of solid particles 214. In some examples, the molten metal infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder).

In some examples, article 101 may also include one or more optional outer coatings applied to outer surface layer including, for example, a bond coat, an environmental barrier coating (EBC), an abradable coating layer, a calcia-magnesia-aluminosilicate (CMAS)-resistant layer, or the like. In some examples, a single layer of the one or more optional outer coatings may perform two or more of these functions.

Figure 3:
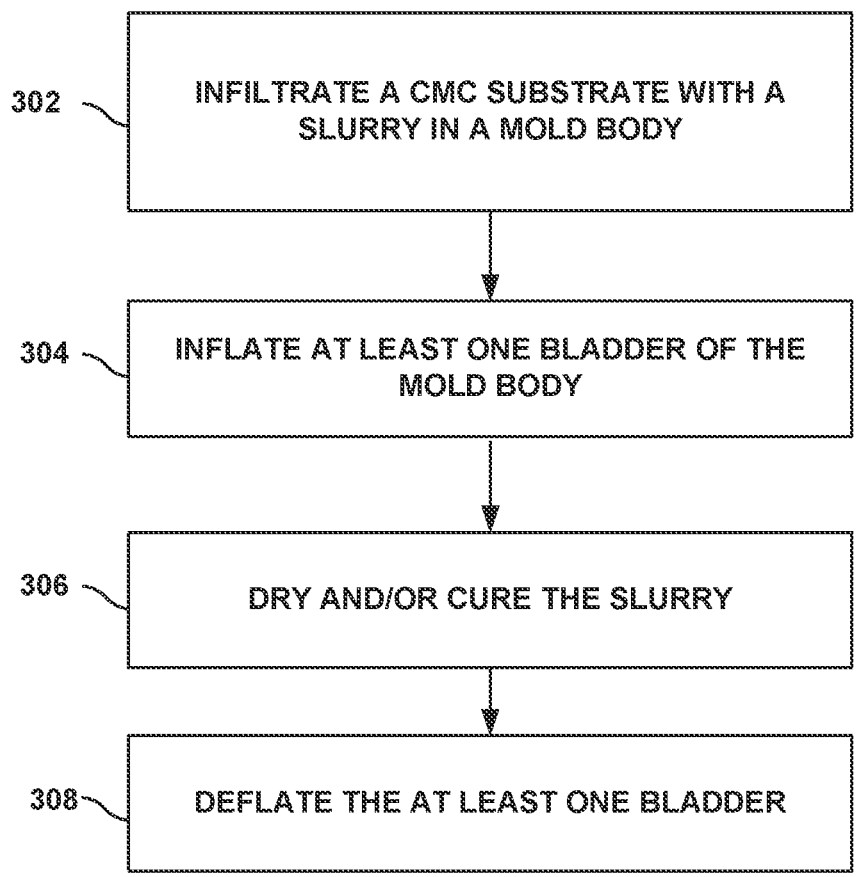
FIG. 3 is flow diagram illustrating an example technique of a bladder cast slurry infiltration process to form an article.

FIG. 3 is a flow diagram illustrating an example technique for forming an article via slurry infiltration using inflatable bladders. While the technique is described with reference to system 100 and article 101 illustrated in FIGS. 1 and 2, in other examples, the technique may be used to form other articles, or article 101 may be formed using a technique different than that described in reference to FIG. 3.

Although not illustrated in FIG. 3, the technique may include forming CMC substrate 216. CMC substrate 216 may be formed using any suitable fiber preform manufacturing technique including, but not limited to, arranging of chopped fibers, forming non-woven fabrics, forming woven fabrics, lay-up of fabrics, filament winding, braiding, and/or knotting. Additionally or alternatively, CMC substrate 216 may be acquired in prefabricated form.

The technique illustrated in FIG. 3 includes infiltrating a CMC substrate 216 with slurry 210 including carrier material 212 and solid particles 214 (302). Slurry 210 may be applied to CMC substrate 216 using any suitable technique that allows solid particles 214 to at least partially infiltrate the inner spaces 218 (e.g., pores) of CMC substrate 216. In some examples, infiltrating CMC substrate 216 may include placing CMC substrate 216 into cavity 114, sealing mold body 102, and introducing slurry 210 into cavity 114 to surround CMC substrate 216. Introducing slurry 210 into cavity 114 may include controlling, by computing device 106, slurry reservoir 108 to introduce slurry 210 into cavity 114. In other examples, infiltrating CMC substrate 216 may include applying slurry 210 to CMC substrate (e.g., by dip coating, spraying, brushing, or the like) prior to placing CMC substrate into mold body 102.

In some examples, the technique may include drawing a vacuum within cavity 114. For example, drawing a vacuum may include controlling, by computing device 106, vacuum pump 110 to draw a vacuum (e.g., relative to atmospheric pressure) within cavity 114. Drawing the vacuum may improve infiltration of slurry 210 into inner spaces 118 of CMC substrate 116 by removing at least some gases from inner spaces 118 to reduce pressure gradients that may form within inner spaces 118 during infiltration of slurry 210.

After introducing slurry 210 into cavity 114, the technique illustrated in FIG. 3 includes inflating at least one bladder of bladders 104 (304). In some examples, inflating bladders 104 may include controlling, by computing device 106, fluid reservoir 112 to inflate one or more of bladders 104. Bladders 104 may be inflated at a selected rate, inflated to a selected pressure, or both. The selected rate and/or selected pressure may be determined based on a mechanical stability of CMC substrate 216. For example, the selected rate and/or the selected pressure may be less than an inflation rate and/or an inflation pressure that would cause damage to or deformity of CMC substrate 216.

In some examples, inflating bladders 104 may include simultaneously inflating bladders 104. In some examples, inflating bladders 104 may include selectively inflating one or more first bladders and subsequently inflating one or more second bladders to prevent or reduce damage or deformity of CMC substrate 216 during inflation of bladders 104. For example, bladder 104A may be at least partially inflated to contact interior surfaces of tips 119 of CMC substrate 116 and bladder 104D may be at least partially inflated to contact exterior surface of base 117 of CMC substrate 116. Subsequently, bladders 104B and 104C may be at least partially inflated to contact the exterior surfaces of tips 119 and interior surface of base 117. Each of bladders 104A and 104D, and bladders 104B and 104C, may be inflated at a selected rate and to a selected pressure to prevent or reduce movement of CMC substrate within cavity 114, to prevent or reduce damage or deformity of base 117 and/or tips 119, or both. Other inflation sequences maybe used depending on a geometry of CMC substrate 216 or other factors that may affect the position or orientation of CMC substrate 216 during inflation of bladders 104 or that may affect the rate or extent of slurry infiltration into CMC substrate 216.

After inflating bladders 104, the technique illustrated in FIG. 3 include drying and/or curing slurry 210 (306). The drying and/or curing may be conducted in any suitable manner. In some examples, the infiltrated CMC substrate 216 can be dried at room temperature under vacuum at about 133 Pa, or may be dried at ambient pressure at a temperature of up to about 150° C. In some examples, drying and/or curing slurry 210 may remove at least a portion of carrier material 212, leaving solid particles 214 within at least some inner spaces 218 of CMC substrate 216. In some examples, drying and/or curing slurry 210 may result in a bladder cast surface 226.

In some examples, an inflation of one or more bladders 104 may be adjusted during drying and/or curing. For example, a pressure of bladders 104 may be increased one or more times at one or more increments of pressure during drying and/or curing. Increasing the pressure of bladders 104 during drying and/or curing may affect a surface finish of surface 226 by urging solid particle 214 toward surface 224 of CMC substrate 216, further urge infiltration of slurry 210 into inner spaces 218, or both. Additionally, or alternatively, a pressure of bladders 104 may be decreased one or more times at one or more increments of pressure during drying and/or curing. Decreasing the pressure of bladders 104 may affect a surface finish of surface 226 by enabling separation of solid particles 214 at or near surface 226 (e.g., relative to surface 224 of CMC substrate 216), facilitate release of article 101 after drying, or both.

After drying and/or curing the slurry, the technique illustrated in FIG. 3 includes deflating bladders 104 (308). In some examples, deflating bladders 104 may include heating mold body 102 and/or article 101 to melt a release agent, such as a wax. After bladders are deflated, article 101 may be removed from mold body 102.

In some examples, the technique may include infiltrating article 101 with a molten infiltrant to form a composite CMC article. The molten infiltrant may include a molten metal or molten alloy infiltrant. The molten metal or molten alloy infiltrant may wick between reinforcement material 220 and/or solid particles 214 to occupy at least some interstices remaining within inner spaces 218 after drying and/or curing the slurry. In some examples, the melt infiltration process may densify the resultant composite CMC article to define an average porosity of less than about 5%, or less than about 3%, or less than about 1%.

In some examples, the molten metal or molten alloy infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder). In some examples, the temperature for metal alloy infiltration such as Si metal infiltration is between about 1400° C. and about 1500° C. Under these conditions, the duration of the infiltration may be between about 15 minutes and about 4 hours, or between about 20 minutes and about 60 minutes. The melt infiltration process may be carried out under vacuum, or in inert gas under atmospheric pressure to limit evaporation losses.

In some examples, the technique may include machining surface 226 of article 101. In some examples, machining surface 226 may be performed before or after melt infiltration. Machining surface 226 may remove excess material (e.g., solid particles 214) to define a contact surface for contacting another component or material (e.g., one or more optional coatings). The machining may include, for example, milling, turning, shaping, planing, grinding, polishing, tumbling, grit blasting, etching, or the like.

In some examples, after melt infiltration and/or machining, the technique may include applying one or more optional coatings such as, for example, a bond coat, an EBC, a TBC, an abradable layer, a CMAS-resistant layer, or the like using one or more of the techniques discussed above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
    infiltrating a ceramic matrix composite (CMC) substrate positioned in a cavity of a mold body with a slurry, wherein the CMC substrate comprises reinforcement material defining inner spaces, wherein the slurry comprises solid particles and a carrier material, wherein the slurry at least partially fills at least a portion of the inner spaces of the CMC substrate;
    inflating a plurality of bladders coupled to the mold body and disposed within the cavity, wherein a surface of a first bladder of the plurality of bladders in an inflated configuration contacts a first surface of the CMC substrate, a surface of a second bladder of the plurality of bladders contacts a second, opposite surface of the CMC substrate, wherein each bladder of the plurality of bladders, when in the inflated configuration, is shaped to define a selected mold shape of the CMC substrate, and wherein each of the first bladder and the second bladder includes a bellows that controls a direction of inflation of the bladder;
    drying the slurry to remove at least a portion of the carrier material to form an infiltrated CMC comprising the solid particles; and
    deflating at least one bladder of the plurality of bladders.

2. The method of claim 1, wherein inflating the plurality of bladders urges the slurry into at least one inner space of the CMC substrate.

3. The method of claim 1, wherein inflating the plurality of bladders comprises:
    at least partially inflating one or more first bladders; and
    after at least partially inflating one or more first bladders, at least partially inflating one or more second bladders.

4. The method of claim 1, wherein inflating the plurality of bladders comprises simultaneously inflating the plurality of bladders.

5. The method of claim 1, wherein drying the slurry further comprises increasing a pressure of the at least one bladder of the plurality of bladders.

6. The method of claim 1, wherein drying the slurry further comprises decreasing a pressure of the at least one bladder of the plurality of bladders.

7. The method of claim 1, wherein at least one bladder of the plurality of bladders comprises a release agent on at least a portion of the surface of the bladder, wherein deflating the at least one bladder further comprises heating the mold body to at least partially melt or soften a release agent.

8. The method of claim 1, wherein infiltrating the CMC substrate with the slurry further comprises drawing a vacuum in the mold body.

9. The method of claim 1, wherein the CMC substrate defines an interior recess defining multiple surfaces, and wherein the method further comprises:
    imparting a bladder cast finished to each surface of the multiple surface of the interior recess of the CMC component by inflating the first bladder to contact each surface of the multiple surfaces of the interior recess of the CMC substrate.

10. The method of claim 9, wherein the CMC substrate is a turbine engine seal segment having a base and a plurality of tips, and wherein the method further comprises:
    contacting an interior surface of each of the plurality of tips with the first bladder of the plurality of bladders, and
    contacting the base with the second bladder of the plurality of bladders.

11. The method of claim 10, wherein the first bladder of the plurality of bladders defines a rectangular prism shape.

12. A method comprising:
    infiltrating a ceramic matrix composite (CMC) substrate positioned in a cavity of a mold body with a slurry, wherein the CMC substrate is a turbine engine seal segment having a base and a plurality of tips, wherein the CMC substrate comprises reinforcement material defining inner spaces, wherein the slurry comprises solid particles and a carrier material, and wherein the slurry at least partially fills at least a portion of the inner spaces of the CMC substrate;
    inflating a plurality of bladders coupled to the mold body and disposed within the cavity, wherein a surface of a first bladder of the plurality of bladders in an inflated configuration contacts an interior surface of each of the plurality of tips of the CMC substrate, and a surface of a second bladder of the plurality of bladders contacts the base of the CMC substrate, wherein each bladder of the plurality of bladders, when in the inflated configuration, is shaped to define a selected mold shape of the CMC substrate;

drying the slurry to remove at least a portion of the carrier material to form an infiltrated CMC comprising the solid particles; and deflating at least one bladder of the plurality of bladders.

13. A method comprising:

infiltrating a ceramic matrix composite (CMC) substrate positioned in a cavity of a mold body with a slurry, wherein the CMC substrate comprises reinforcement material defining inner spaces, wherein the slurry comprises solid particles and a carrier material, wherein the slurry at least partially fills at least a portion of the inner spaces of the CMC substrate;

inflating a plurality of bladders coupled to the mold body and disposed within the cavity, wherein a surface of a first bladder of the plurality of bladders in an inflated configuration contacts a first surface of the CMC substrate, and a surface of a second bladder of the plurality of bladders contacts a second, opposite surface of the CMC substrate, wherein each bladder of the plurality of bladders, when in the inflated configuration, is shaped to define a selected mold shape of the CMC substrate, and wherein the first bladder of the plurality of bladders defines a rectangular prism shape;

drying the slurry to remove at least a portion of the carrier material to form an infiltrated CMC comprising the solid particles; and deflating at least one bladder of the plurality of bladders.

* * * * *